(12) United States Patent
Moon et al.

(10) Patent No.: US 12,039,297 B2
(45) Date of Patent: Jul. 16, 2024

(54) CODE INSPECTION INTERFACE PROVIDING METHOD AND APPARATUS FOR IMPLEMENTING THE METHOD

(71) Applicant: SAMSUNG SDS CO., LTD., Seoul (KR)

(72) Inventors: Hyung Suk Moon, Seoul (KR); Hee Cheol Park, Seoul (KR); Yoon Chan Jhi, Seoul (KR); Jong Hwan Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 80 days.

(21) Appl. No.: 17/853,821

(22) Filed: Jun. 29, 2022

(65) Prior Publication Data
US 2023/0004361 A1 Jan. 5, 2023

(30) Foreign Application Priority Data

Jun. 30, 2021 (KR) ........................ 10-2021-0085708

(51) Int. Cl.
*G06F 9/44* (2018.01)
*G06F 8/34* (2018.01)
(52) U.S. Cl.
CPC ..................................... *G06F 8/34* (2013.01)
(58) Field of Classification Search
None
See application file for complete search history.

(56) References Cited

U.S. PATENT DOCUMENTS

| 8,850,415 | B2 | 9/2014 | Huuck et al. | |
|---|---|---|---|---|
| 9,411,581 | B2* | 8/2016 | Peled | G06F 8/51 |
| 2005/0188364 | A1* | 8/2005 | Cockx | G06F 8/456 |
| | | | | 717/159 |
| 2015/0309813 | A1 | 10/2015 | Patel | |
| 2017/0214701 | A1* | 7/2017 | Hasan | G06N 20/00 |
| 2018/0276105 | A1* | 9/2018 | Srinivasan | G06N 20/00 |
| 2019/0180035 | A1* | 6/2019 | Esperer | G06F 8/42 |

(Continued)

FOREIGN PATENT DOCUMENTS

| CN | 112733158 A | 4/2021 |
|---|---|---|
| KR | 10-1051600 B1 | 7/2011 |

(Continued)

OTHER PUBLICATIONS

Office Action issued Nov. 10, 2023 by Korean Patent Office in corresponding Korean Patent Application No. 10-2023-0037923.

*Primary Examiner* — Qamrun Nahar
(74) *Attorney, Agent, or Firm* — Sughrue Mion, PLLC

(57) ABSTRACT

A code inspection interface providing method according to an embodiment of this disclosure includes providing a graphical user interface (GUI) for performing code inspection, executing an analysis routine on an inspection target code when the inspection target code is selected through the GUI, and providing the result of executing the analysis routine. The analysis routine may include an operation of extracting an abstract syntax tree includes a plurality of nodes from the inspection target code. A code inspection interface providing method is capable of providing an interface that can analyze a code and detect a security vulnerability in real time regardless of the language version of the code and an apparatus for implementing the method.

20 Claims, 17 Drawing Sheets

(56) References Cited

U.S. PATENT DOCUMENTS

2020/0394313 A1* 12/2020 Ionescu ................ G06F 21/577
2021/0132915 A1*  5/2021 Ivankovic ................ G06F 8/40

FOREIGN PATENT DOCUMENTS

| KR | 10-2018-0009582 A | 1/2018 |
| KR | 10-2019-0030490 A | 3/2019 |
| KR | 10-1981028 B1 | 5/2019 |
| KR | 10-2020-0132460 A | 11/2020 |

* cited by examiner

| Category | ERROR | WARNING | INFORMATION | TOTAL |
|---|---|---|---|---|
| Architecture | 2 | 4 | 0 | 6 |
| Coding | 5 | 7 | 2 | 14 |
| Develop Rule | 15 | 8 | 1 | 24 |
| Performance | 15 | 14 | 10 | 39 |
| Short Dump | 7 | 4 | 5 | 16 |
| Vulnerability | 2 | 24 | 15 | 41 |
| TOTAL | 46 | 61 | 33 | 140 |

FIG. 7

| No | Category | Level 2 | Rule Set | RULE DETECTION RANGE (SYNTAX ANALYSIS/ SEMANTIC ANALYSIS) | Priority | SEVERITY |
|---|---|---|---|---|---|---|
| A01 | Architecture | MODULARIZATION OF DESIGN | INADEQUATE MODULARIZATION | | II | Error |
| A02 | Architecture | MODULARIZATION OF DESIGN | CHECK: CHECK DEPTH OF CONDITIONAL /REPETITIVE STATEMENTS | | II | Warning |
| A03 | Architecture | DESIGN FLAWS | INCLUDE PROGRAM IN MODULE CONTAINS EXIT | | I | Error |
| C10 | Coding | HAZARD RELATED | USE OF PROHIBITED STATEMENT | | I | Error |
| C11 | Coding | HAZARD RELATED | USE OF REAL (STATIC) IP ADDRESS | | I | Error |

FIG. 8

CODE INSPECTION INTERFACE PROVIDING METHOD AND APPARATUS FOR IMPLEMENTING THE METHOD

CROSS-REFERENCE TO RELATED APPLICATION AND CLAIM OF PRIORITY

This application claims the benefit under 35 USC § 119 of Korean Patent Application No. 10-2021-0085708, filed on Jun. 30, 2021, in the Korean Intellectual Property Office, the entire disclosure of which is incorporated herein by reference for all purposes.

BACKGROUND

1. Field

The present disclosure relates to a code inspection interface providing method and an apparatus for implementing the method, and more particularly, to a code inspection interface providing method for providing an interface for analyzing whether a code complies with a rule and/or analyzing security vulnerabilities and an apparatus for implementing the method.

2. Description of the Related Art

Commercial and enterprise software generally requires a high level of security and is often required to comply with unique code writing rules set by a developer or user of the software.

In the case of programs written in the most widely used programming languages such as C language, JAVA language and Python, analysis tools for analyzing whether a code complies with a rule and/or analyzing security vulnerabilities have been provided.

However, the functions and utilization of a tool for inspecting a program code executed in conjunction with SAP, which is enterprise resource planning (ERP) for enterprises, and implemented in an advanced business application programming (ABAP) language are very limited.

For example, if a grammar is changed as the ABAP language is upgraded, a new tool for code inspection has to be implemented.

In addition, it takes a long time to detect a security vulnerability in a code, and it is difficult to analyze the security vulnerability in real time. Moreover, if a security vulnerability detection function is executed in a code analysis environment, there is a possibility that a security problem will occur.

Therefore, there is a need for a technology that can analyze a code regardless of the language version of the code and detect a security vulnerability in real time at the same time as the development of the code.

SUMMARY

Aspects of the present disclosure provide a code inspection interface providing method capable of providing an interface that can analyze a code and detect a security vulnerability in real time regardless of the language version of the code and an apparatus for implementing the method.

Aspects of the present disclosure also provide a code inspection interface providing method capable of reducing development time by providing an environment in which security vulnerabilities can be analyzed and corrected in real time at the same time as the development of a code and an apparatus for implementing the method.

Aspects of the present disclosure also provide a code inspection interface providing method capable of providing an accurate analysis result by setting a flexible rule set applicable according to a development environment and user settings, and an apparatus for implementing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

In some embodiments, a code inspection interface providing method performed by a computing apparatus may comprise, providing a graphical user interface (GUI) for performing code inspection, executing an analysis routine on an inspection target code when the inspection target code is selected through the GUI and providing the result of executing the analysis routine, wherein the analysis routine comprises an operation of extracting an abstract syntax tree comprised of a plurality of nodes from the inspection target code.

In some embodiments, the analysis routine may comprise a first analysis routine implemented in a first programming language and a second analysis routine implemented in a second programming language. The first analysis routine may comprise an operation of extracting an abstract syntax tree comprised of a plurality of nodes from the selected inspection target node and an operation of providing the extracted abstract syntax tree as an input to the second analysis routine, and the second analysis routine may comprise an operation of analyzing the inspection target code using at least a part of the abstract syntax tree provided by the first analysis routine.

In some embodiments, the providing of the result of executing the analysis routine may comprise providing action guide information for the inspection target code based on the result of executing the analysis routine.

In some embodiments, the providing of the GUI for performing code inspection may comprise displaying a first GUI for receiving an input for selecting the inspection target code, a second GUI for receiving an input for setting a rule set used by the analysis routine, and a third GUI for providing the result of executing the analysis routine.

In some embodiments, the executing of the analysis routine on the inspection target code may comprise identifying a code section violating at least a part of a preset rule set from the inspection target code.

In some embodiments, A code inspection interface providing apparatus may comprise: one or more processors; a communication interface communicating with an external device; a memory loading a computer program to be executed by the processors; and a storage storing the computer program, The computer program may comprise instructions for performing an operation of providing a GUI for performing code inspection, an operation of executing an analysis routine on an inspection target code when the inspection target code is selected through the GUI, and an operation of providing the result of executing the analysis routine, wherein the analysis routine extracts an abstract syntax tree comprised of a plurality of nodes from the inspection target code.

BRIEF DESCRIPTION OF THE DRAWINGS

These and/or other aspects will become apparent and more readily appreciated from the following description of the embodiments, taken in conjunction with the accompanying drawings in which:

FIG. 7 is a table showing an exemplary category configuration of rule sets according to embodiments of the present disclosure;

FIG. 8 is an example in which priority and severity attributes are given to each rule according to embodiments of the present disclosure;

DETAILED DESCRIPTION

Figure 1:
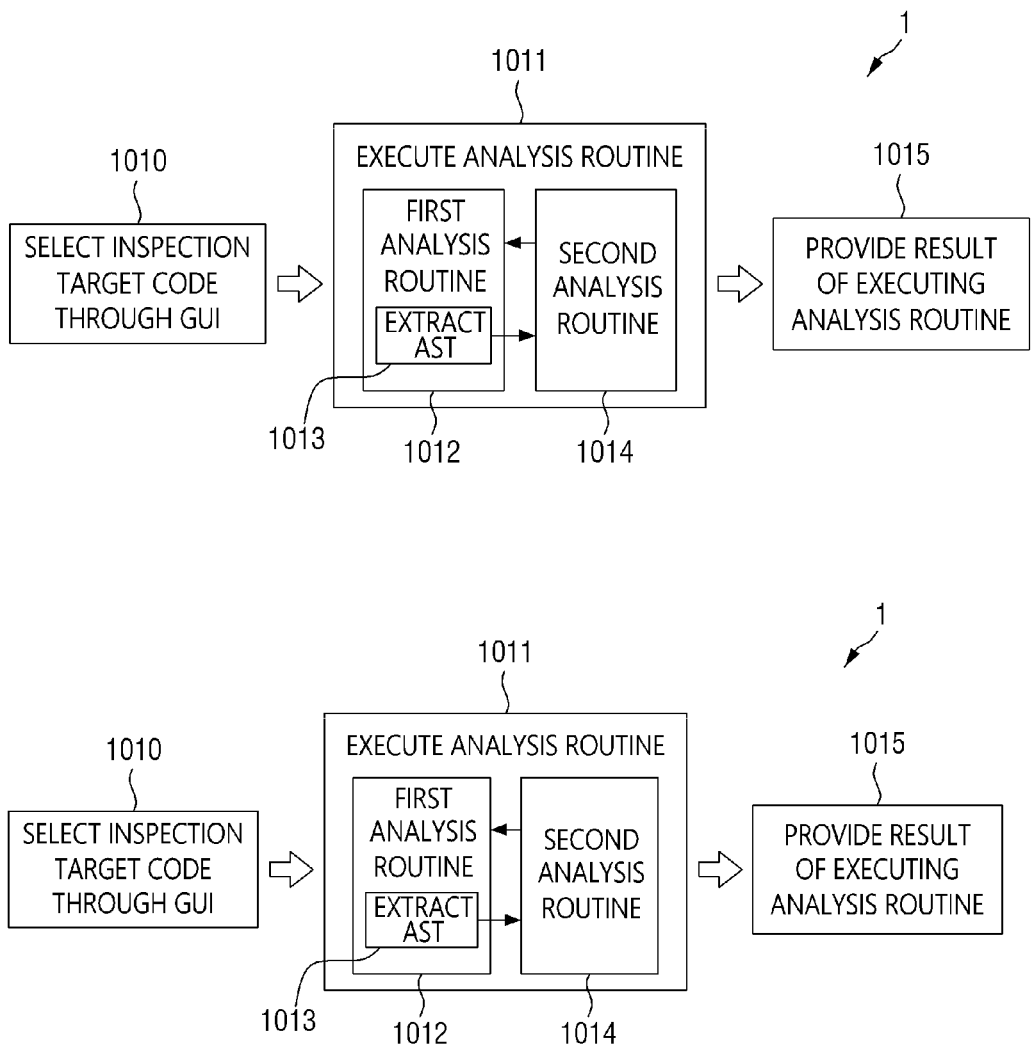
FIG. 1 is a conceptual diagram for explaining embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described in detail with reference to the accompanying drawings.

FIG. 1 is a conceptual diagram for explaining embodiments of the present disclosure. Referring to FIG. 1, a code inspection interface providing apparatus 1 according to an embodiment of the present disclosure provides an interface through which a developer can perform code analysis while developing a program and receive the result of code analysis.

First, the code inspection interface providing apparatus 1 receives selection of an inspection target code through a graphical user interface (GUI) provided to a developer's terminal device (operation 1010) and executes an analysis routine on the selected inspection target code (operation 1011). Here, the analysis routine may include a first analysis routine 1012 and a second analysis routine 1014 capable of analyzing the inspection target code based on different types of rule sets. For example, the first analysis routine 1012 may analyze the inspection target code by applying a rule set belonging to a category such as architecture, coding, develop rule, performance or dump, and the second analysis routine 1014 may analyze the inspection target code by applying a rule set related to security vulnerability.

The first analysis routine 1012 and the second analysis routine 1014 may be implemented in different programming languages, and the programming language used for the first analysis routine 1012 may be the same as the programming language used for writing the inspection target code. For example, when the inspection target code is an advanced business application programming (ABAP) language of SAP, the first analysis routine 1012 may be implemented in the ABAP language, and the second analysis routine 1014 may be implemented in the JAVA language or the like.

The first analysis routine 1012 may extract an abstract syntax tree (AST) from the inspection target code and analyze the inspection target code based on the extracted abstract syntax tree.

The second analysis routine 1014 may receive the abstract syntax tree extracted by the first analysis routine 1012, analyze the inspection target code using at least a part of the received abstract syntax tree, and output the analysis result to the first analysis routine 1012.

When the executing of the analysis routine (operation 1011) by the first analysis routine 1012 and the second analysis routine 1014 is completed as described above, the result of executing the analysis routine is provided through the GUI (operation 1015). Here, the result of executing the analysis routine may include details of a code section identified from the inspection target code as violating at least a part of the rule set applied to the first analysis routine 1012 and the second analysis routine 1014. For example, the result of executing the analysis routine may include the type of an object included in the inspection target code, the name of the object, a violated rule, a source location, and an action guide. Here, the type of the object may be classified as, for example, PROG, FUNC, CLAS, ENQU, REPS, TYPE, or VIEW.

In addition, the result of executing the analysis routine may show the number of rule violations according to severity attribute. For example, in giving a severity attribute classified as error, warning, or information to each rule and providing the result of executing the analysis routine, the number of rule violations may be aggregated and provided for each of error, warning, and information. Here, a rule violation score may be calculated using the number of rule violations corresponding to error and warning, and the scope of actions for the inspection target code may be determined depending on whether the calculated rule violation score is greater than or equal to a standard value.

As described above, the code inspection interface providing apparatus 1 according to the embodiment of the present disclosure can provide an interface capable of analyzing a code and detecting a security vulnerability in real time regardless of the language version of the code. In addition, the code inspection interface providing apparatus 1 can provide an environment in which security vulnerabilities can be analyzed and corrected in real time at the same time as the development of the code.

Figure 2:
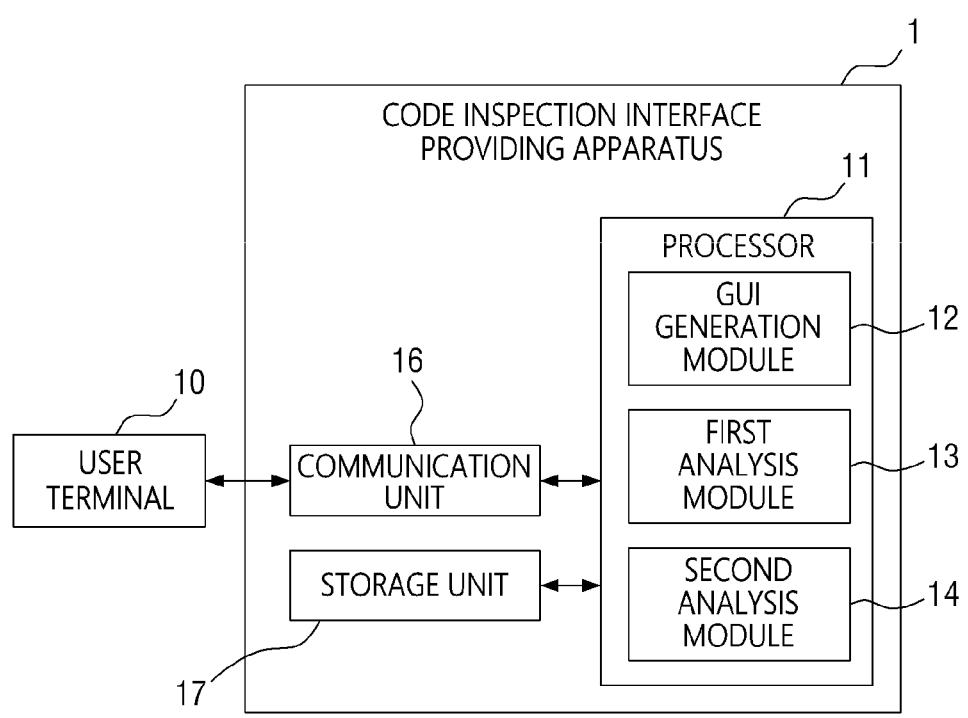
FIG. 2 is a block diagram of a code inspection interface providing apparatus according to an embodiment of the present disclosure.

FIG. 2 is a block diagram of a code inspection interface providing apparatus 1 according to an embodiment of the present disclosure. The code inspection interface providing apparatus 1 according to the embodiment of the present disclosure may include a communication unit 16, a storage unit 17 and a processor 11 and may be connected to a user terminal 10 through the communication unit 16.

The code inspection interface providing apparatus 1 may be an apparatus for providing an interface capable of performing a series of operations for code analysis and may be implemented as, for example, a computing apparatus such as a server or a PC.

The communication unit 16 communicates with the user terminal 10 using a wired or wireless communication method. The communication unit 16 may communicate with the user terminal 10 using a wired communication method such as Ethernet or communicates with the user terminal 10 using a wireless communication method such as Wi-Fi or Bluetooth. The communication method of the communication unit 16 is not limited to the above methods, and the communication unit 16 may also communicate using other communication methods.

The storage unit 17 may store information about a rule set used for an analysis routine of an inspection target code and information about the result of executing the analysis routine on the inspection target code. In addition, the storage unit 17 may store action guide information according to rule violation details, reference information for action exception handling, and information about rule violation score calculation standards.

The processor 11 may include a GUI generation module 12, a first analysis module 13 and a second analysis module 14 and may further include an additional module related to the provision of the result of analyzing an inspection target code. Although the GUI generation module 12, the first analysis module 13, and the second analysis module 14 are included in the same device in the illustrated example, they may also run on different devices.

The GUI generation module 12 provides a GUI for performing code inspection. The GUI generation module 12 may generate a GUI related to selection, analysis, and result provision of an inspection target code and provide the GUI to a developer's terminal device.

In an embodiment, the GUI generation module 12 may generate and provide a first GUI for receiving an input for selecting an inspection target code, a second GUI for receiving an input for setting a rule set used by an analysis routine, and a third GUI for providing the result of executing the analysis routine.

The first analysis module 13 executes a first analysis routine on an inspection target code selected through a GUI provided by the GUI generation module 12. The first analysis routine may include an operation of extracting an abstract syntax tree composed of a plurality of nodes from the inspection target code selected through the GUI and an operation of analyzing the inspection target code based on the extracted abstract syntax tree.

Here, the first analysis routine may apply a preset rule when analyzing the inspection target code based on the abstract syntax tree and identify a code section violating at least a part of the preset rule set from the inspection target code.

The first analysis module 13 may input the abstract syntax tree extracted by the first analysis routine to the second analysis module 14 so that the inspection target code can be further analyzed.

The second analysis module 14 executes a second analysis routine on the inspection target code by using at least a part of the abstract syntax tree received from the first analysis module 13.

The second analysis routine may identify a code section violating at least a part of an applied rule set from the inspection target code by applying the rule set different from the rule set applied by the first analysis routine. For example, the first analysis routine may analyze the inspection target code by applying a rule set belonging to a category such as architecture, coding, develop rule, performance or dump, and the second analysis routine may analyze the inspection target code by applying a rule set related to security vulnerability.

The second analysis module 14 may output the analysis result of the second analysis routine to the first analysis module 13.

The processor 11 provides the result of executing an analysis routine on the inspection target code, which is output from each of the first analysis module 13 and the second analysis module 14, through a GUI.

The result of executing the analysis routine may include details of a code section identified from the inspection target code as violating at least a part of the rule set applied to each of the first analysis routine and the second analysis routine. In addition, the result of executing the analysis routine may include the number of rule violations aggregated by severity attribute of each rule classified as error, warning, or information. In addition, the result of executing the analysis routine may include a rule violation score calculated using the number of rule violations corresponding to error and warning.

In addition, the processor 11 may provide action guide information for each code section identified as violating at least a part of the rule set applied to an analysis routine by using the result of executing the analysis routine provided as described above.

Figure 3:
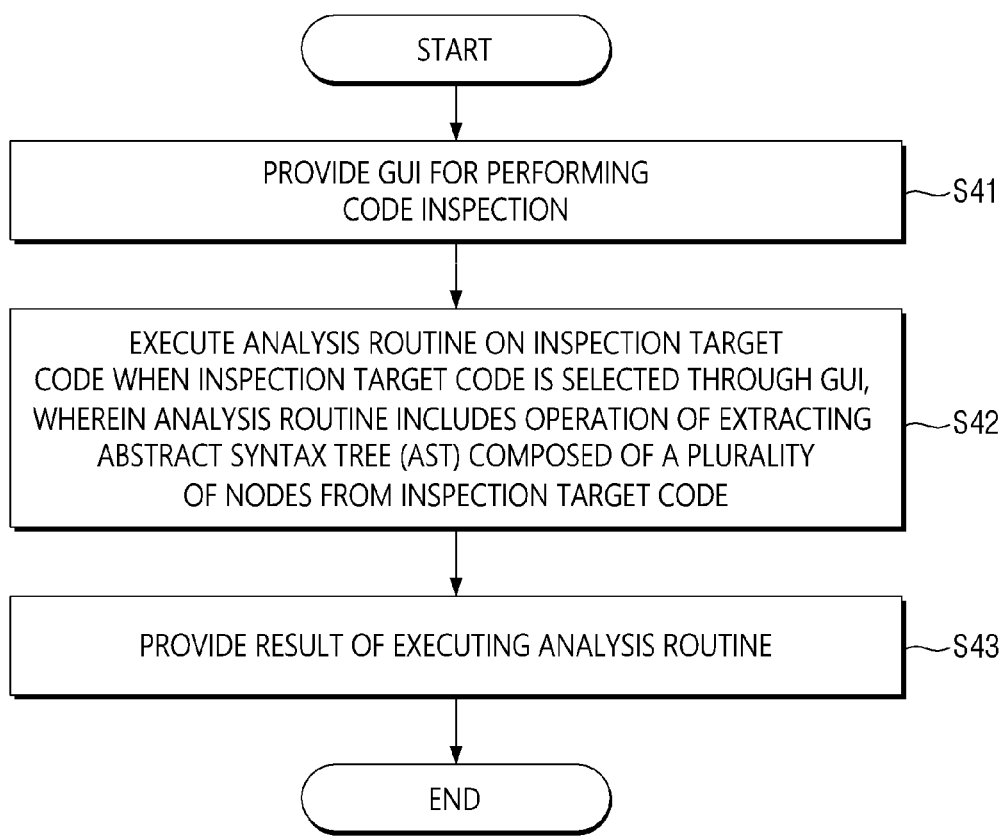
FIG. 3 is a flowchart illustrating a code inspection interface providing method according to an embodiment of the present disclosure.

FIG. 3 is a flowchart illustrating a code inspection interface providing method according to an embodiment of the present disclosure.

The code inspection interface providing method according to the embodiment of the present disclosure may be performed by a computing apparatus 100, for example, by a code inspection interface providing apparatus 1. The computing apparatus 100 performing the method according to the current embodiment may be a computing apparatus having an application program execution environment. It should be noted that a subject performing some operations included in the method according to the embodiment of the present disclosure may not be specified, in which case the subject is the computing apparatus 100.

Referring to FIG. 3, first, a GUI for performing code inspection is provided in operation S41.

As an embodiment, operation S41 may include an operation of displaying a first GUI for receiving an input for selecting an inspection target code, a second GUI for receiving an input for setting a rule set used by an analysis routine for the inspection target code, and a third GUI for providing the result of executing the analysis routine.

As an embodiment, operation S41 may include an operation of providing a GUI for adding a new rule to the rule set used by the analysis routine, deleting an unused rule, and updating a rule.

Next, in operation S42, when an inspection target code is selected through a GUI, an analysis routine is executed on the inspection target code. Here, the analysis routine includes an operation of extracting an abstract syntax tree composed of a plurality of nodes from the inspection target code. Since the abstract syntax tree is extracted from the inspection target code and a detailed analysis routine is executed using the extracted abstract syntax tree, even if the language version of the inspection target code is changed, there is no need to modify the detailed analysis routine, or the weight of the code to be modified may be reduced.

As an embodiment, the analysis routine may include a first analysis routine implemented in a first programming language and a second analysis routine implemented in a second programming language. Here, the first analysis routine may include an operation of extracting an abstract syntax tree composed of a plurality of nodes from the selected inspection target code, an operation of providing the extracted abstract syntax tree as an input to the second analysis routine, and an operation of analyzing the inspection target code using at least a part of the abstract syntax tree. The second analysis routine may include an operation of analyzing the inspection target code using at least a part of the abstract syntax tree provided by the first analysis routine.

As an embodiment, the first programming language may be a programming language used to write the inspection target code. For example, when the inspection target code is written in the ABAP language of SAP, the first analysis routine may be implemented in the ABAP language, and the second analysis routine may be implemented in the JAVA language.

As an embodiment, operation S42 may include an operation of identifying a code section violating at least a part of a preset rule set from the inspection target code.

As an embodiment, in operation S42, the operation of identifying the code section may include an operation of generating a control flow graph showing an execution order of the inspection target code based on the abstract syntax tree and an operation of converting the inspection target code into an intermediate representation based on the abstract syntax tree.

In addition, in operation S42, the operation of identifying the code section may include an operation of identifying a code section violating at least a part of the preset rule set based on the result of analyzing a call relationship between functions included in the inspection target code, a variable value used at a specific time, and a point where a change has occurred by an external input value.

As an embodiment, operation S42 may include an operation of selecting a rule subset to be applied to the analysis routine from among the preset rule set by using a priority attribute given to each rule. Here, the priority attribute given to each rule may be, for example, I level (high), II level (medium), or III level (low) according to the importance of the rule, and the rule subset to be applied to the analysis routine may be selected only from a priority attribute of, for example, I level (high).

As an embodiment, operation S42 may include an operation of identifying a code section violating a first rule for detecting a prohibited statement. For example, a sentence in which a macro is declared may be detected from the inspection target code based on the first rule, and whether at least one of a list of pre-stored prohibited statements has been used in the sentence in which the macro is declared may be detected.

As an embodiment, operation S42 may include an operation of identifying a code section violating a second rule for handling an exception of a remote function communication (RFC) function. For example, whether an exception related to the RFC function has been registered in the inspection target code may be identified based on the second rule, whether a RAISE Exception statement exists in a code section corresponding to the RFC function may be identified, and, if the RAISE Exception statement does not exist, whether the RAISE Exception statement exists in Include within Function Group may be identified.

As an embodiment, operation S42 may include an operation of identifying a code section violating a third rule for checking whether ENQUEUE and DEQUEUE are used in the RFC function. For example, whether a data manipulation language (DML) statement is used in a code section corresponding to the RFC function in the inspection target code may be identified based on the third rule, and if the DML statement is used, whether a character string 'ENQUEUE_E*' exists may be identified.

As an embodiment, operation S42 may include an operation of identifying a code section violating a fourth rule for detecting buffering of a view in which two or more tables are joined. For example, when the type of the inspection target code is a view, whether the view exists in a database may be identified based on the fourth rule, and if joined tables exist in the view, whether buffering has been set in the view may be identified.

The first through fourth rules will be described in more detail with reference to FIGS. 14 through 17.

Finally, in operation S43, the result of executing the analysis routine is provided. Here, the result of executing the analysis routine may include details of a code section identified from the inspection target code as violating at least some rules of the rule set applied to the analysis routine. In addition, the result of executing the analysis routine may include the number of rule violations aggregated by severity attribute of each rule classified as error, warning, or information. In addition, the result of executing the analysis routine may include a rule violation score calculated using the number of rule violations corresponding to error and warning.

As an embodiment, operation S43 may include an operation of providing action guide information for the inspection target code based on the result of executing the analysis routine.

In the method according to the embodiment of the present disclosure described above, it is possible to provide an interface capable of analyzing a code and detecting a security vulnerability in real time regardless of the language version of the code. In addition, it is possible to reduce development time by providing an environment in which security vulnerabilities can be analyzed and corrected in real time at the same time as the development of the code.

Figure 4:
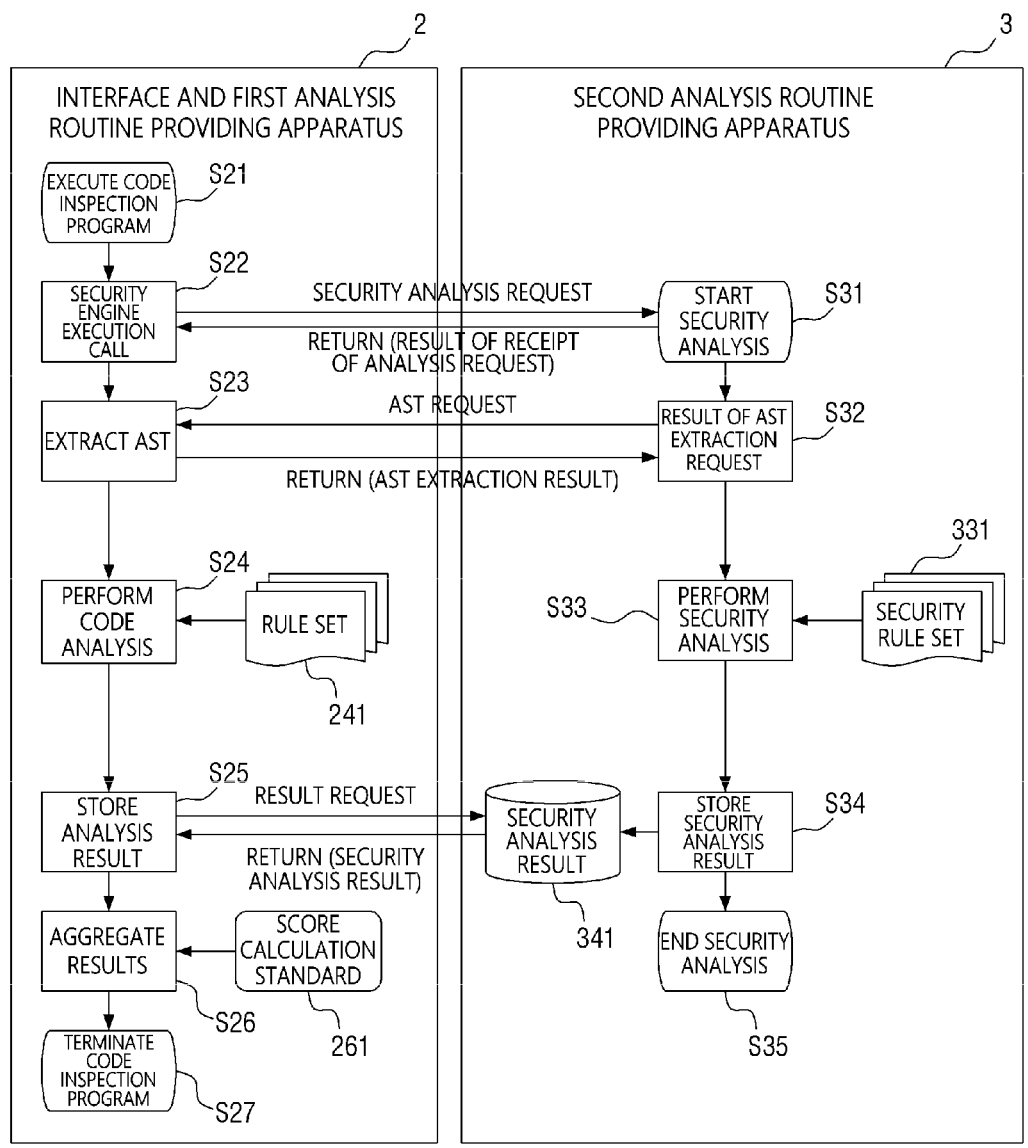
FIG. 4 is an example illustrating an operation flow of an interface and a first analysis routine providing apparatus and a second analysis routine providing apparatus according to embodiments of the present disclosure.

FIG. 4 is an example illustrating an operation flow of an interface and a first analysis routine providing apparatus 2 and a second analysis routine providing apparatus 3 according to embodiments of the present disclosure. Referring to FIG. 4, the interface and the first analysis routine providing apparatus 2 perform a series of operations of analyzing an inspection target code by executing a code inspection program. The second analysis routine providing apparatus 3 performs security analysis on the inspection target code when receiving a security analysis request from the interface and the first analysis routine providing apparatus 2 and provides the result of the security analysis to the interface and the first analysis routine providing apparatus 2.

In the illustrated example, when the interface and the first analysis routine providing apparatus 2 execute a code inspection program (operation S21), a security analysis request is transmitted to the second analysis routine providing apparatus 3 through a security engine execution call (operation S22). Here, information required for analysis such as an object type, an object name, a list of applied rules, a server ID, an analysis timeout per object, and an analysis ID may be transmitted.

The second analysis routine providing apparatus 3 returns an 'OK' value as a result of receiving the security analysis request and, when starting security analysis (operation S31), requests the interface and the first analysis routine providing apparatus 2 to extract an abstract syntax tree.

The interface and the first analysis routine providing apparatus 2 extract the abstract syntax tree from the inspection target code (operation S23) at the request of the second analysis routine providing apparatus 3 and return the result to the second analysis routine providing apparatus 3.

The interface and the first analysis routine providing apparatus 2 may perform code analysis using the extracted abstract syntax tree (operation S24) and, at this time, may identify a code section violating at least a part of a preset rule set 241.

The second analysis routine providing apparatus 3 may also perform security analysis (operation S33) using the result of extracting the abstract syntax tree (operation S32) received from the interface and the first analysis routine providing apparatus 2 and, at this time, may identify a code section violating at least a part of a preset security rule set 331.

When completing the code analysis (operation S24), the interface and the first analysis routine providing apparatus 2 store the result of performing the code analysis (operation S25) and request the second analysis routine providing apparatus 3 to provide the result of performing the security analysis (operation S33).

When completing the security analysis (operation S33), the second analysis routine providing apparatus 3 stores the result of performing the security analysis (operation S34) and then returns the result to the interface and the first analysis routine providing apparatus 2 and ends the security analysis (operation S35).

The interface and first analysis routine providing apparatus 2 aggregate results using the stored code analysis result and the security analysis result returned from the second analysis routine providing apparatus 3 (operation S26) and then terminate the code inspection program (operation S27). Here, a rule violation score may be calculated from the code analysis result and the security analysis result by using a score calculation standard 261. For example, the rule violation score may be calculated using the number of rule violations corresponding to error and warning and a ratio of the total number of lines of the code to the number of reference lines.

Figure 5:
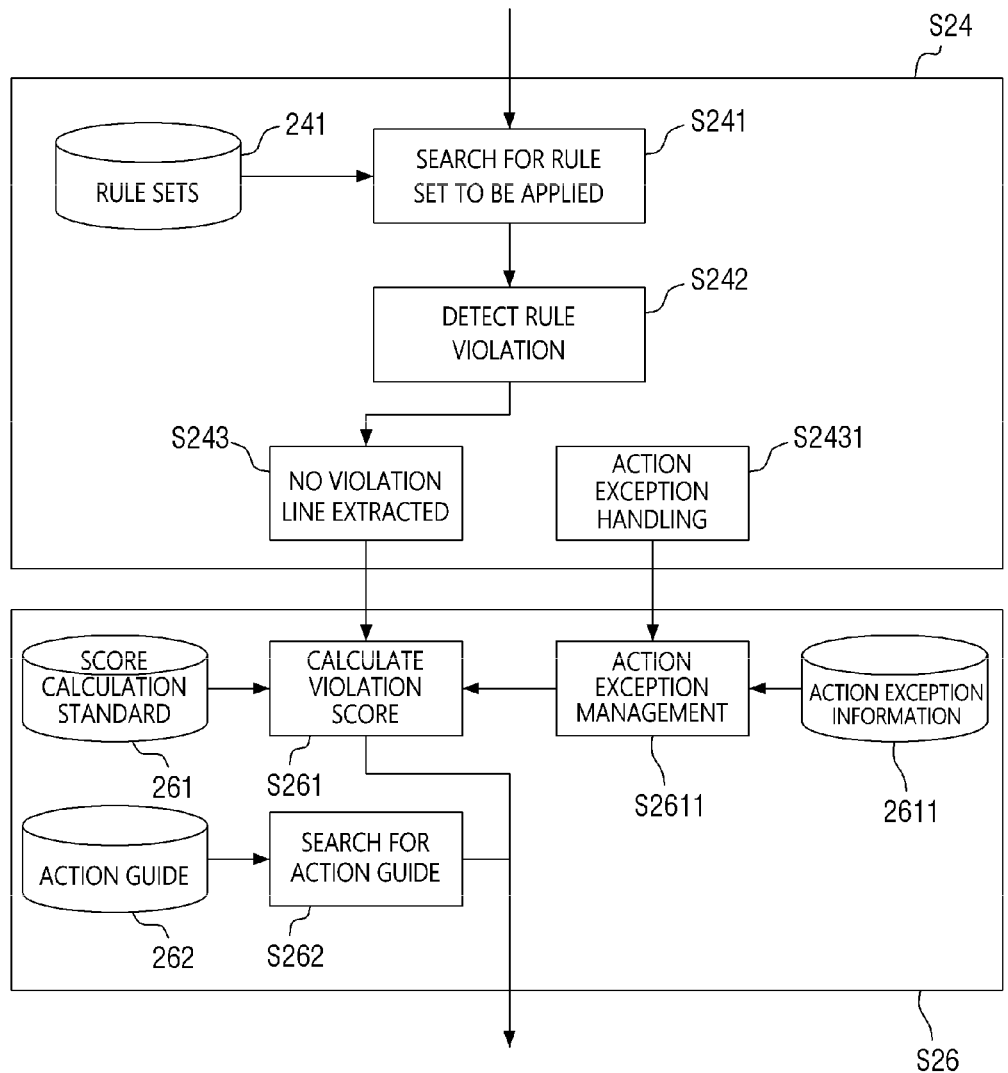
FIG. 5 is an example illustrating a rule compliance checking process of a code inspection interface providing apparatus according to embodiments of the present disclosure.

FIG. 5 is an example illustrating a rule compliance checking process of a code inspection interface providing apparatus according to embodiments of the present disclosure. Referring to FIG. 5, when performing code analysis (operation S24), the interface and the first analysis routine providing apparatus 2 may search for a rule set to be applied with reference to pre-stored rule sets 241 (operation S241) and detect a code section violating at least a part of the rule set from an inspection target code by using the found rule set (operation S242). Here, a line number of a code section violating a rule may be extracted.

When aggregating the results of the code analysis (operation S26), the interface and the first analysis routine providing apparatus 2 may calculate a rule violation score with reference to a score calculation standard 261 (operation S261) and search for an action guide for each code section violating a rule with reference to action guide information 262 (operation S262).

The interface and the first analysis routine providing apparatus 2 may perform action exception handling (operation S2431) in the process of performing code analysis (operation S24) and aggregating the results (operation S26). That is, a rule stored as action exception information 2611 may be excluded from rule violation score calculation through action exception management (operation S2611).

Figure 6:
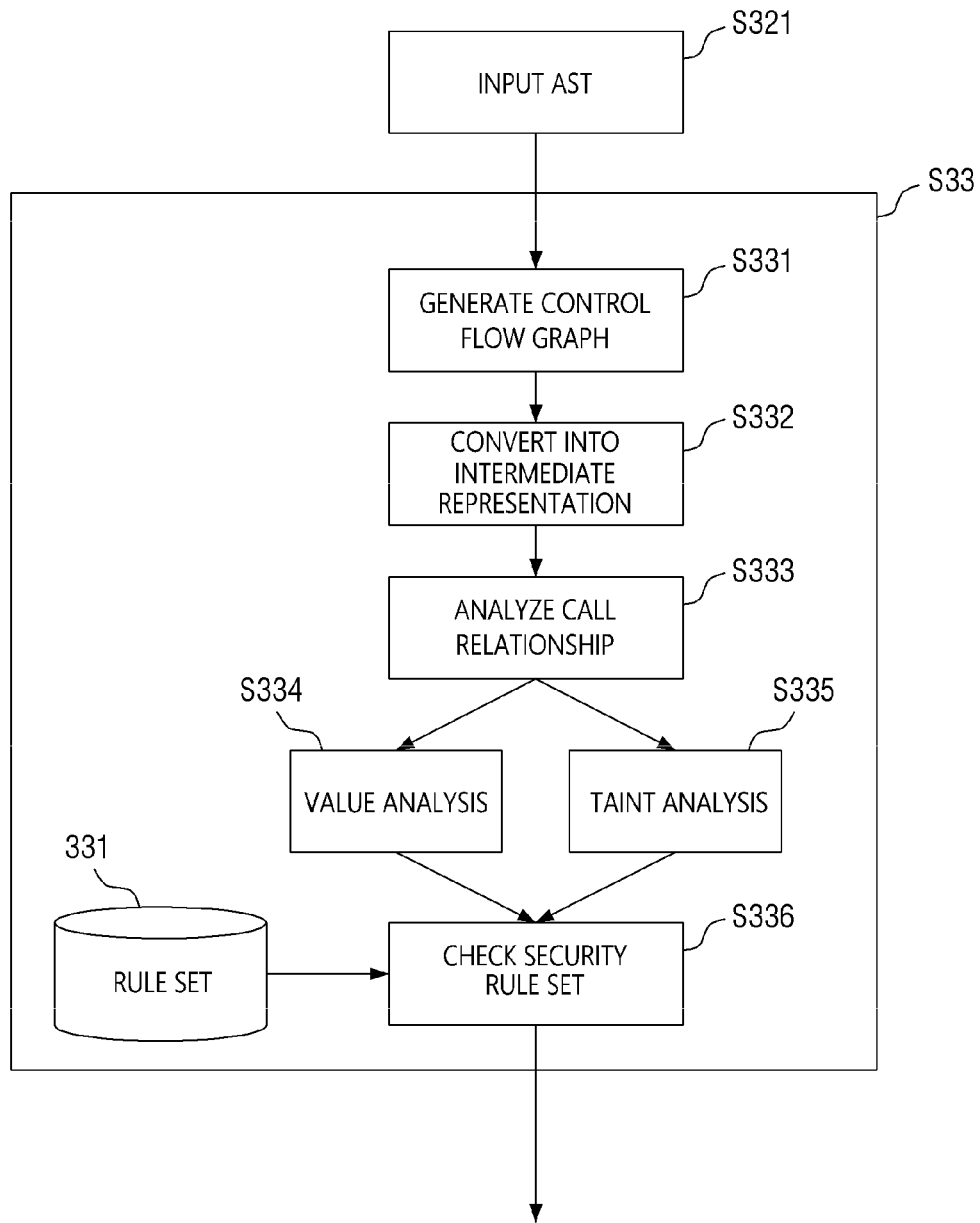
FIG. 6 is an example illustrating a security analysis process according to embodiments of the present disclosure.

FIG. 6 is an example illustrating a security analysis process according to embodiments of the present disclosure. Referring to FIG. 6, when performing security analysis (operation S33), the second analysis routine providing apparatus 3 may generate a control flow graph showing an execution order of an inspection target code (operation S331) using an abstract syntax tree received from the interface and the first analysis routine providing apparatus 2 (operation S321) and convert the inspection target code into an internal representation (operation S332).

Using the control flow graph and the converted inspection target code, the second analysis routine providing apparatus 3 may analyze a call relationship between functions included in the inspection target code (operation S333), analyze a variable value used at a specific time (operation S334) and perform taint analysis on a point where a change has occurred by an external input value (operation S335) and identify a code section violating some rules of a preset security rule set 331 from the analysis result (operation S336).

Due to the above operation of the interface and the first analysis routine providing apparatus 2 and the second analysis routine providing apparatus 3 according to the embodiment of the present disclosure, it is possible to provide an environment in which security vulnerabilities can be analyzed and corrected in real time at the same time as the development of a code. In addition, it is possible to provide an accurate analysis result by setting a flexible rule set applicable according to a development environment and user settings.

FIG. 7 is a table showing an exemplary category configuration of rule sets according to embodiments of the present disclosure. Referring to FIG. 7, an analysis routine executed by the interface and the first analysis routine providing apparatus 2 and the second analysis routine providing apparatus 3 may perform analysis by applying a preset rule set.

As in the illustrated example, rule sets may be classified into a plurality of categories such as architecture, coding, develop rule, performance, dump, and vulnerability.

In this case, a rule set corresponding to each category may include a plurality of rules classified into error, warning, and information.

The interface and the first analysis routine providing apparatus 2 and the second analysis routine providing apparatus 3 may execute an analysis routine on an inspection target code by applying rule sets belonging to different categories. For example, the second analysis routine providing apparatus 3 may perform analysis by applying only a rule set related to security vulnerability, and the interface and the first analysis routine providing apparatus 2 may perform analysis by applying a rule set other than the rule set applied by the second analysis routine providing apparatus 3.

FIG. 8 is an example in which priority and severity attributes are given to each rule according to embodiments of the present disclosure. Referring to FIG. 8, a priority attribute and a severity attribute may be given to each rule included in rule sets belonging to different categories. For example, a priority attribute such as I level (high), II level (medium), or III level (low) may be given to each rule according to the importance of the rule. In addition, a severity attribute such as error, warning, or information may be given to each rule.

As an embodiment, when executing an analysis routine on an inspection target code, the code inspection interface providing apparatus 1 may select a rule subset to be applied to the analysis routine from among a preset rule set by using the priority attribute.

As an embodiment, when providing the result of executing the analysis routine on the inspection target code, the code inspection interface providing apparatus 1 may classify and provide results by severity attribute of each rule.

Figure 9:
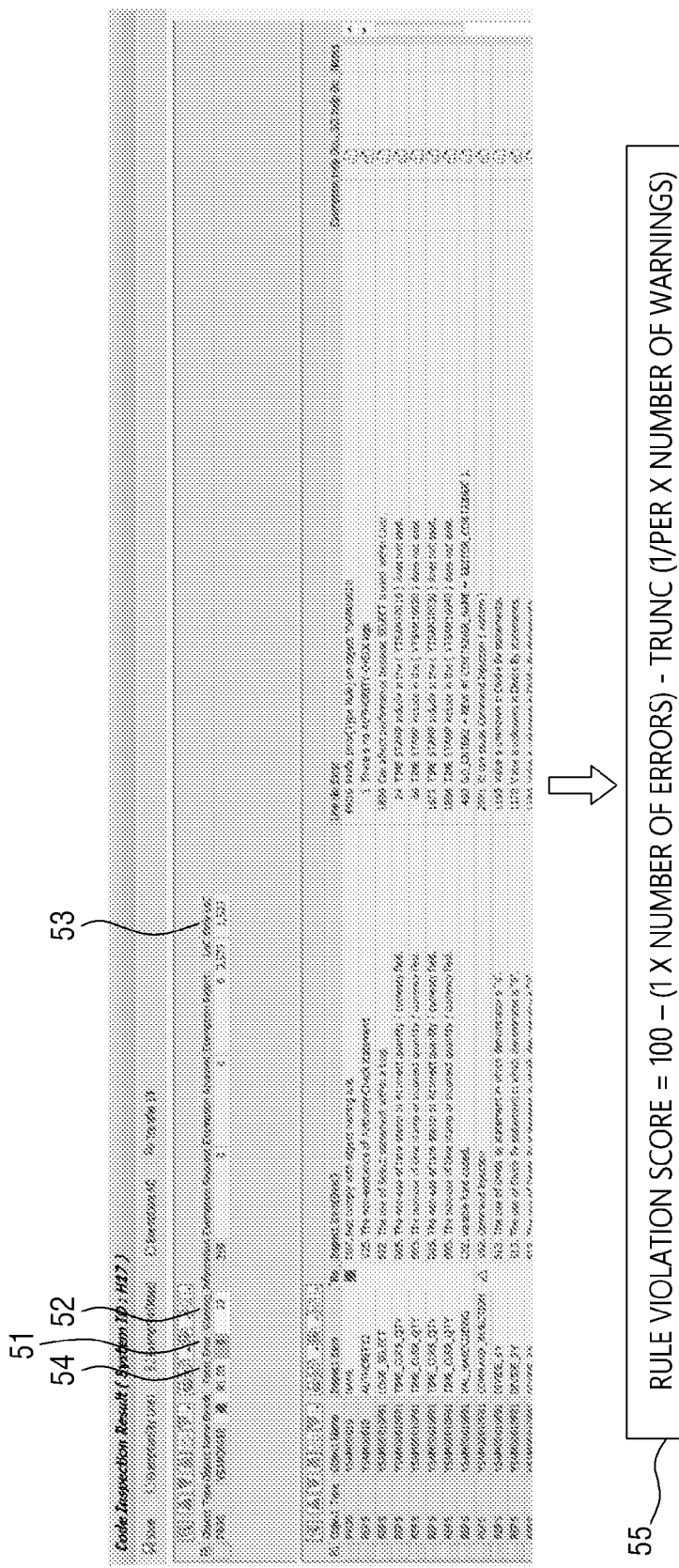
FIG. 9 is an example of calculating a rule violation score based on a code analysis result according to embodiments of the present disclosure.

FIG. 9 is an example of calculating a rule violation score based on a code analysis result according to embodiments of the present disclosure. Referring to FIG. 9, the code inspection interface providing apparatus 1 may provide a GUI for displaying the result of executing an analysis routine on an inspection target code.

Here, details of a code section identified as violating a rule from the inspection target code may be displayed on the GUI. For example, information about an object type, an object name, the number of rule violations 51 corresponding to error, the number of violations 52 corresponding to warning, the total number of lines 53, and a rule violation score 54 may be displayed.

The rule violation score 54 may be calculated using a score calculation standard 55, and the score calculation standard 55 may be calculated using the numbers of rule violations 51 and 52 corresponding to error and warning and a ratio PER of the total number of lines 53 to the reference number of lines.

Figure 10:
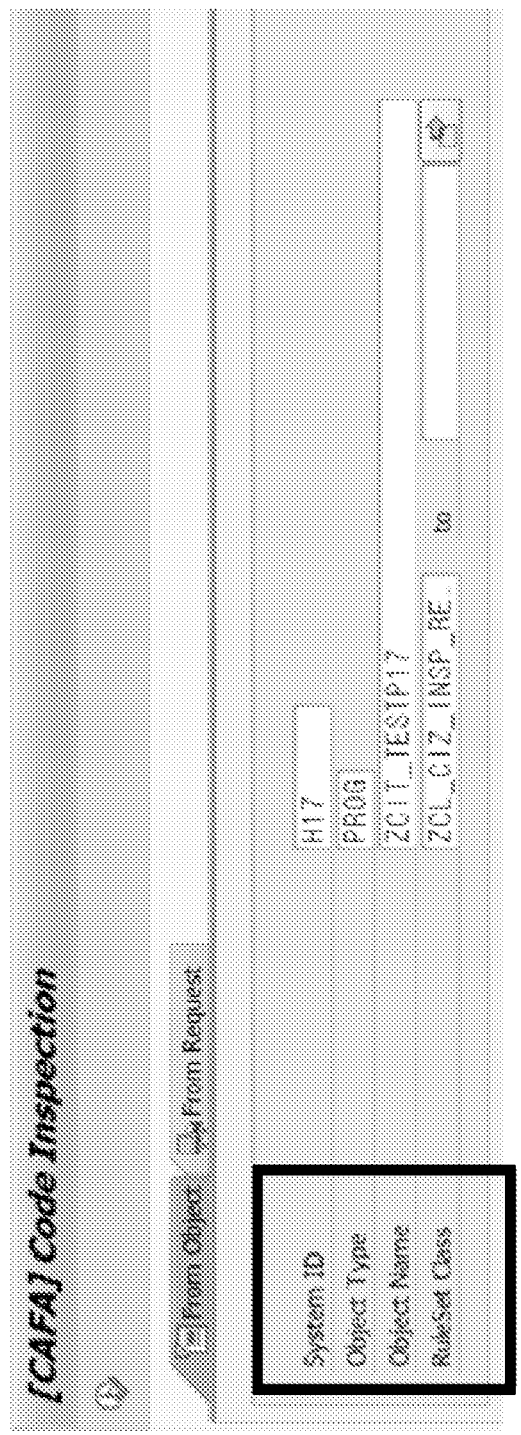
FIG. 10 is an example of an interface for selecting an inspection target code according to embodiments of the present disclosure.
Figure 11:
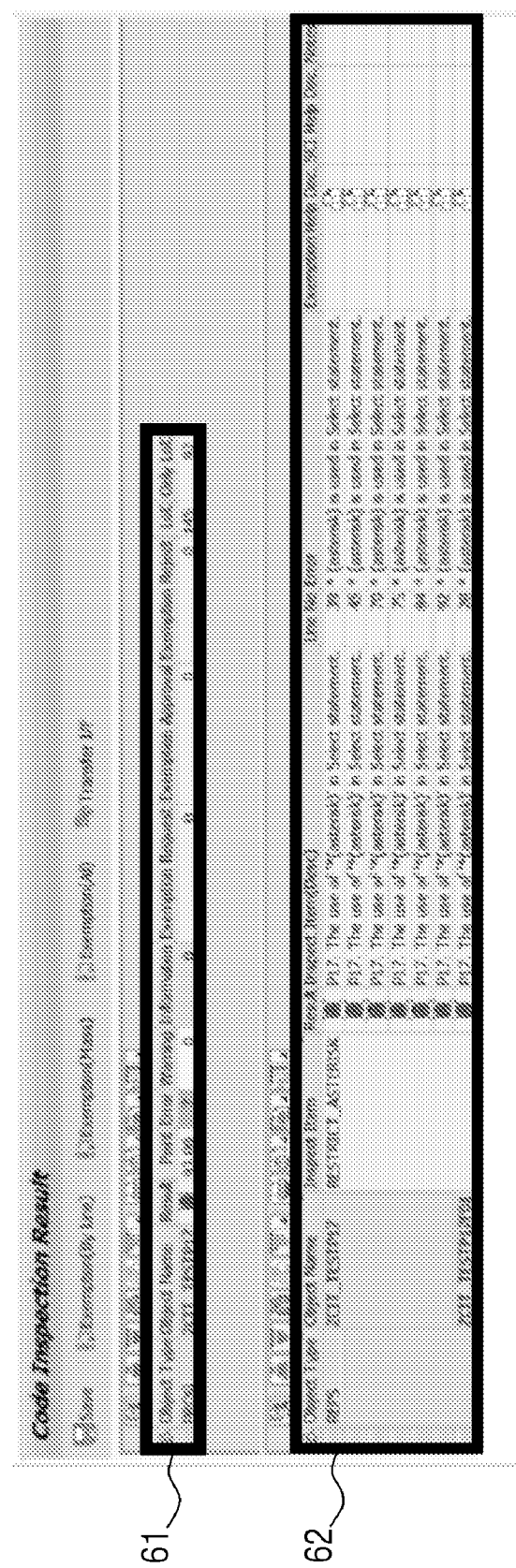
FIG. 11 is an example of an interface for providing a code analysis result according to embodiments of the present disclosure.
Figure 12:
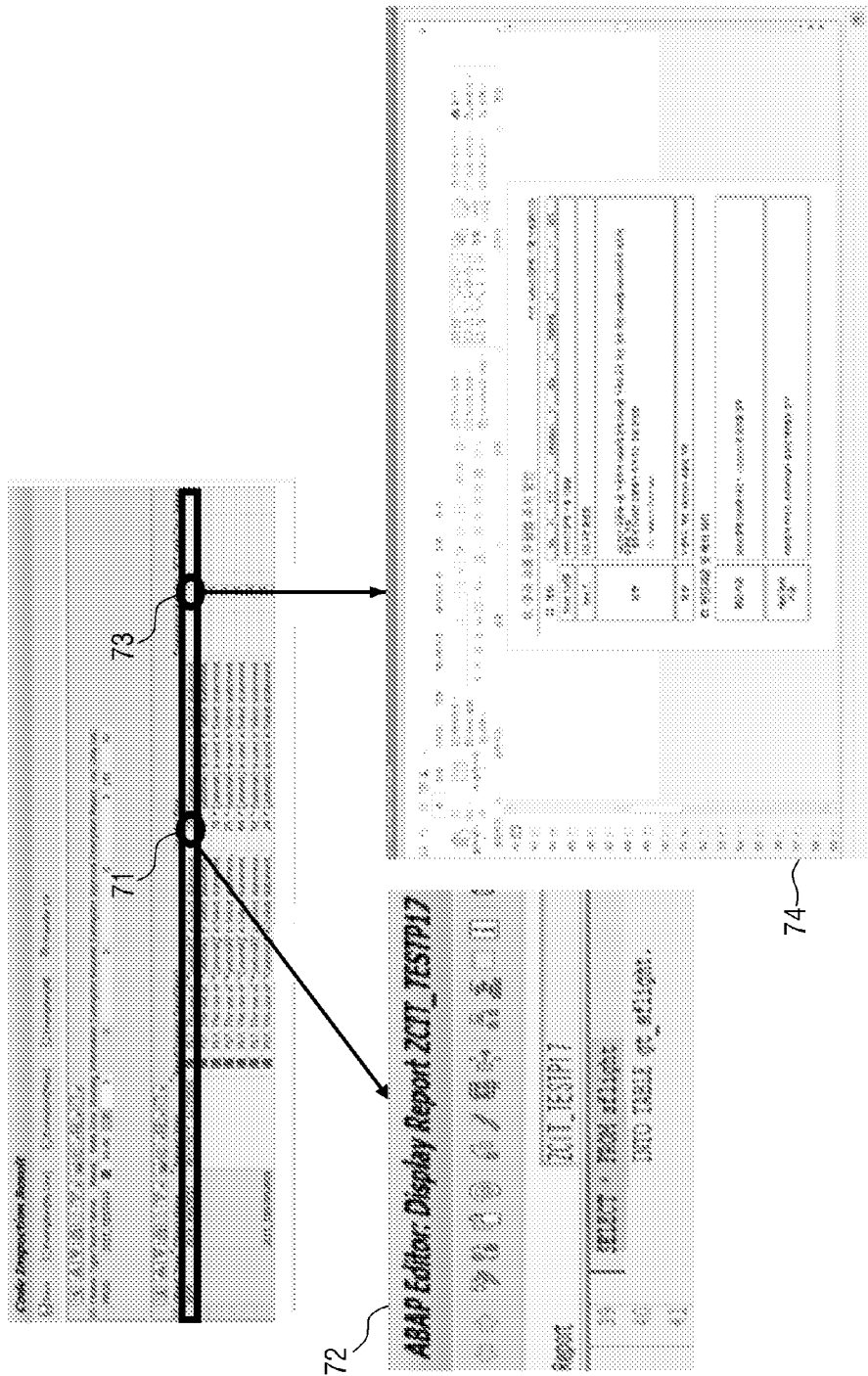
FIG. 12 is an example of an interface for providing an action guide based on a code analysis result according to embodiments of the present disclosure.

FIGS. 10 through 12 are examples of an interface according to embodiments of the present disclosure.

The example illustrated in FIG. 10 is a GUI for receiving an input for selecting an inspection target code and provides an interface for selecting an object type and object name to be analyzed and a rule set to be applied.

The example illustrated in FIG. 11 is a GUI for providing the result of executing an analysis routine on an inspection target code and provides an interface for displaying summary information 61 of the execution result and details 62 of a code section identified as violating a rule from the execution result.

The example illustrated in FIG. 12 is a GUI for providing an action guide according to the result of executing an analysis routine on an inspection target code. When the number of a code section identified as violating a rule is selected (indicated by reference numeral 71), a pop-up screen 72 displaying a source code of the code section is provided. When an action guide icon 73 for the selected code section is selected, a pop-up screen 74 displaying action guide information for the rule violated by the code section is provided.

FIGS. 13 through 16 are examples illustrating the flow of an operation of detecting whether exemplary rules applied for code analysis are violated according to embodiments of the present disclosure.

Figure 13:
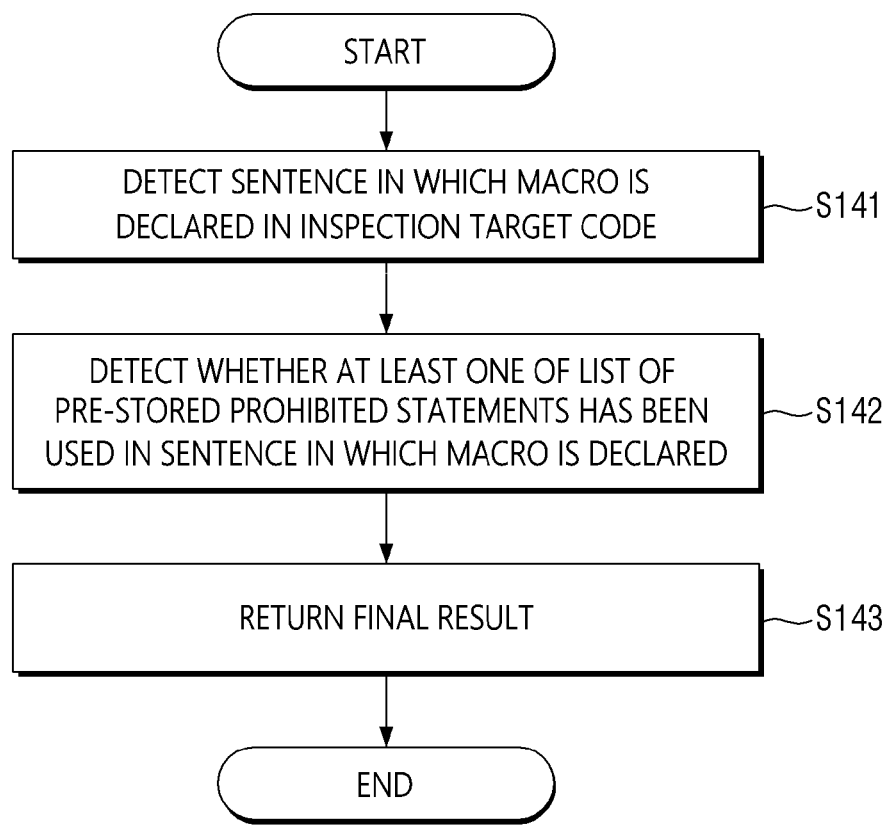
FIGS. 13 through 16 are examples illustrating the flow of an operation of detecting whether exemplary rules applied for code analysis are violated according to embodiments of the present disclosure.

Referring to FIG. 13, the code inspection interface providing apparatus 1 may perform an operation of identifying a code section that violates a first rule for detecting a prohibited statement.

Here, the first rule may be applied when code analysis is performed to detect whether any of a list of managed prohibited statements has been used in a macro. This means that by applying the first rule, it is possible to prevent a rule set for detecting a prohibited statement from being avoided only for development efficiency in a development process and possible to guarantee compliance with development standard rules.

For example, when a rule that prohibits the use of a SELECT statement in a repetitive statement for the sake of program performance is applied, if the SELECT statement is used in a macro statement, analysis is not possible because the existing token analyzer cannot return the SELECT statement in the repetitive statement as a token. The first rule is a rule used to compensate for this limitation and easily detect the use of a prohibited statement in a macro.

The operation of identifying a code section by applying the first rule described above includes the following detailed operations.

First, in operation S141, a sentence in which a macro is declared is detected in an inspection target code. Here, operation S141 may include an operation of determining whether the type of the inspection target code is any one of Executable Program, Modulepool Program, Function Group, Class, and Include Program.

Next, in operation S142, it is detected whether at least one of a list of pre-stored prohibited statements has been used in the sentence in which the macro is declared. Accordingly, when the final result is returned in operation S143, a code section violating the first rule may be identified.

Figure 14:
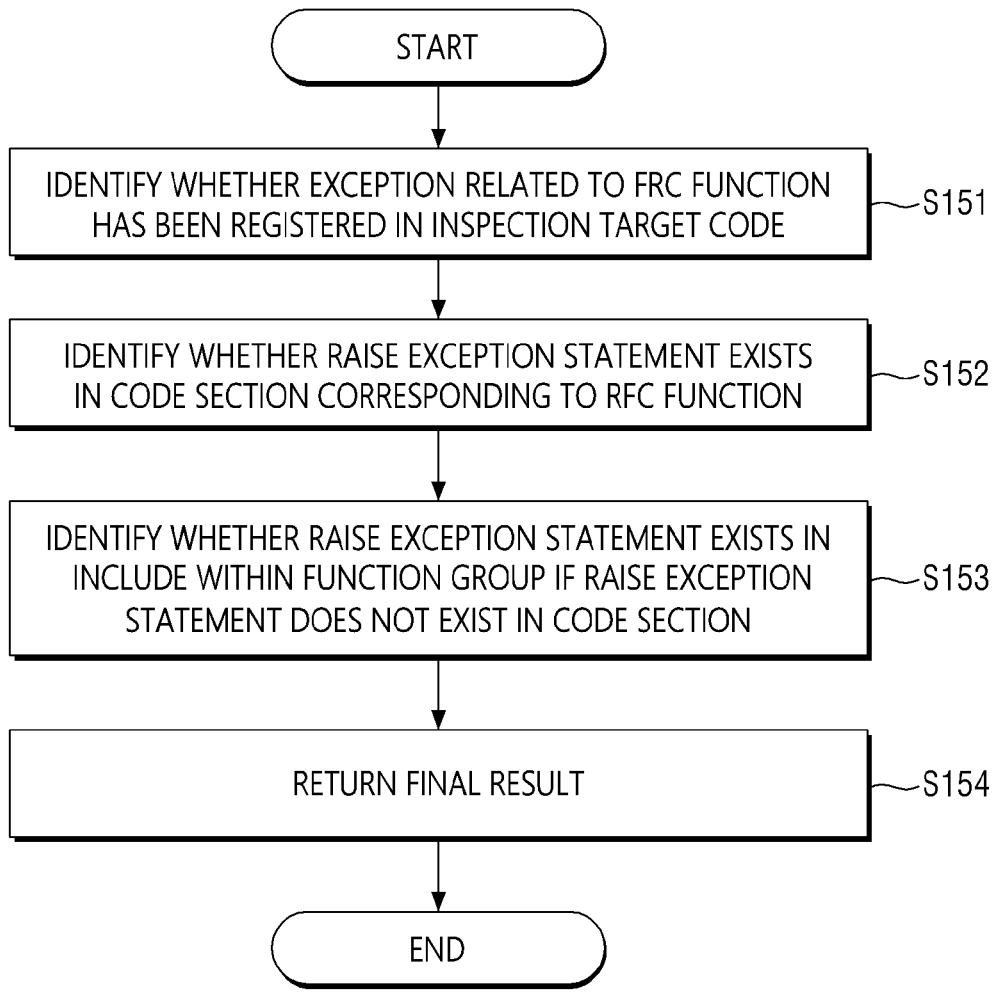

Referring to FIG. 14, the code inspection interface providing apparatus 1 may perform an operation of identifying a code section that violates a second rule for handling an exception of an RFC function. Here, the second rule may be applied when code analysis is performed to prevent an error or dump that may occur in remote function communication with an external system.

The operation of identifying a code section by applying the second rule described above includes the following detailed operations.

Specifically, it is identified whether an exception related to the RFC function has been registered in an inspection target code in operation S151. Then, it is identified whether a RAISE Exception statement exists in a code section corresponding to the RFC function in operation S152. Next, in operation S153, if the RAISE Exception statement does not exist, it is identified whether the RAISE Exception statement exists in Include within Function Group. Accordingly, when the final result is returned in operation S154, a code section violating the second rule may be identified.

Figure 15:
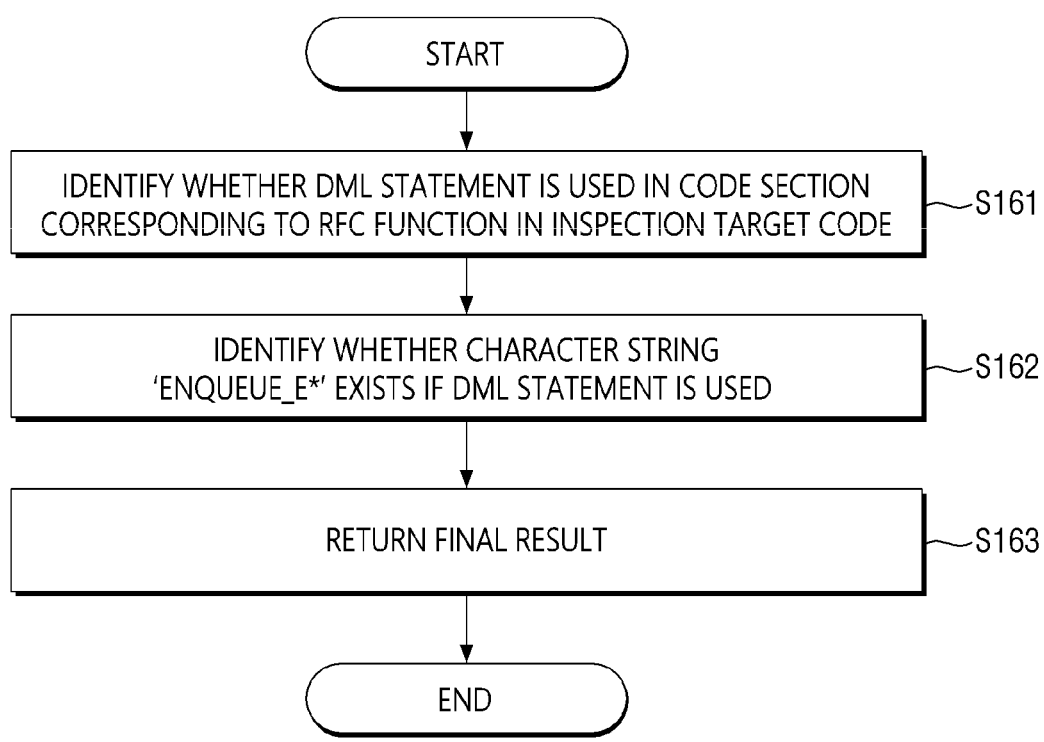

Referring to FIG. 15, the code inspection interface providing apparatus 1 may perform an operation of identifying a code section that violates a third rule for checking whether ENQUEUE and DEQUEUE are used in the RFC function.

Here, like the second rule described above, the third rule may be applied when code analysis is performed to prevent an error or dump that may occur in remote function communication with an external system. In particular, the third rule may be applied to detect whether the ENQUEUE and DEQUEUE statements are used when a DML statement is used in a development process, thereby ensuring data integrity and consistency.

For example, since the DML statement is a statement that causes a database update, it may be developed to apply a TABLE LOCK through the ENQUEUE statement and, when the update is finished, release the TABLE LOCK through the DEQUEUE statement. The third rule is a rule used to detect whether the ENQUEUE and DEQUEUE statements are used when the DML statement is used as described above. When the database is updated by the DML statement, modification access by other users is prevented to synchronize data, thereby ensuring the integrity and consistency of the data.

The operation of identifying a code section by applying the third rule described above includes the following detailed operations.

In operation S161, it is identified whether a DML statement is used in a code section corresponding to the RFC function in an inspection target code. If the DML statement is used, it is identified whether a character string 'ENQUEUE_E*' exists in operation S162. Accordingly, when the final result is returned in operation S163, a code section violating the third rule may be identified.

Figure 16:
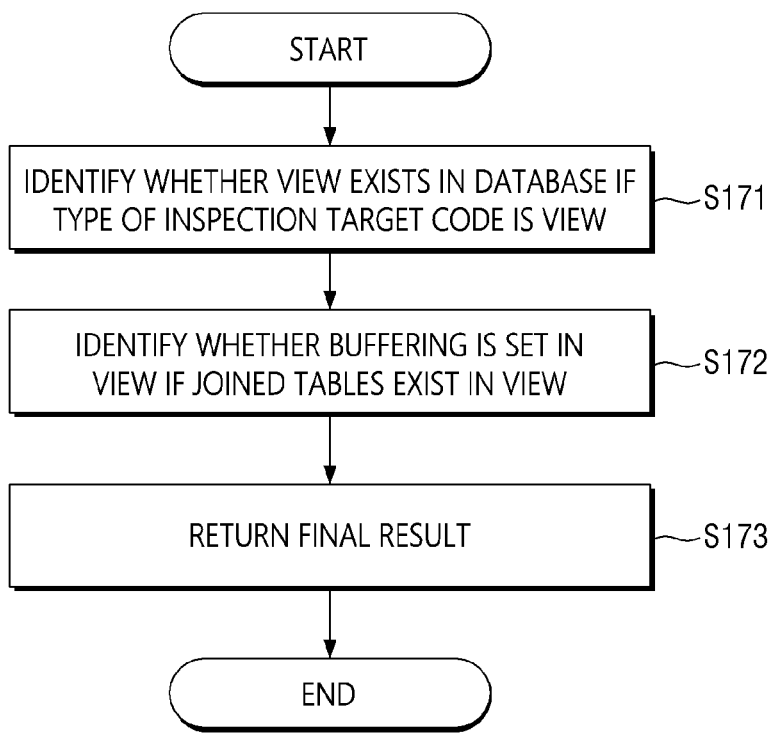

Referring to FIG. 16, the code inspection interface providing apparatus 1 may perform an operation of identifying a code section that violates a fourth rule for detecting buffering of a view in which two or more tables are joined.

Here, in a case where buffering is set in a view in which two or more tables are joined, the fourth rule may be applied when code analysis is performed to prevent all buffer data from being invalidated even when only some data is changed, unlike in buffering of a general table. In particular, by applying the fourth rule, it is possible to detect, in advance, a part where the entire buffer data can be deleted when DB WRITE occurs in the view or where performance degradation can be caused by a buffer load.

For example, even if a buffering method of the view is set to single or generic, the view operates like a full buffer. Therefore, the entire buffer data can be deleted when DB WRITE occurs. In addition, if DB WRITE occurs frequently in the view, a buffer load may occur frequently, causing performance degradation. The fourth rule may be used to detect, in advance, a part where the entire buffer data can be deleted due to the above characteristics of the view and where performance degradation can be caused by a buffer load.

The operation of identifying a code section by applying the fourth rule described above includes the following detailed operations.

In operation S171, if the type of an inspection target code is a view, it is identified whether the view exists in a database. If joined tables exist in the view, it is identified whether buffering is set in the view in operation S172. Here, operation S172 may include an operation of identifying whether a buffer type of the view is P, G, or X by referring to a table including information about the view. In this case, buffer type P refers to a single buffer, and only one entry is stored in the buffer. Buffer type P may be used when the number of times that the database is accessed, such as fetching records multiple times, is relatively large. Buffer type G refers to a generic buffer, and all entries of a table corresponding to a selected key value are stored in the buffer. In addition, buffer type X refers to a full buffer, and records of all tables are stored in the buffer.

Finally, when the final result is returned in operation S173, a code section violating the fourth rule may be identified.

As described above, according to the embodiments of the present disclosure, it is possible to provide an accurate analysis result by setting a flexible rule set applicable according to a development environment and user settings.

Figure 17:
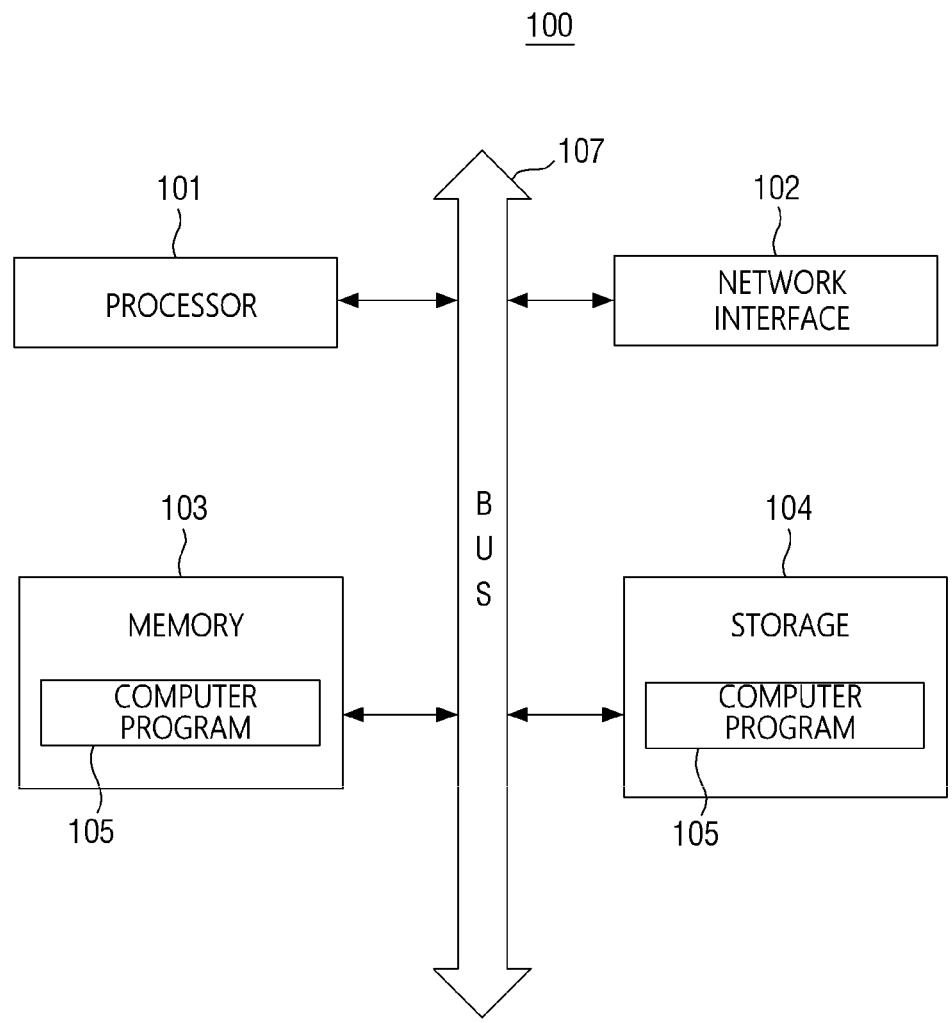
FIG. 17 illustrates the hardware configuration of an exemplary computing apparatus capable of implementing methods according to embodiments of the present disclosure.

FIG. 17 illustrates the hardware configuration of an exemplars computing apparatus 100 capable of implementing methods according to embodiments of the present disclosure. Referring to FIG. 17, the computing apparatus 100 may include one or more processors 101, a bus 107, a network interface 102, a memory 103 which loads a computer program 105 to be executed by the processors 101, and a storage 104 which stores the computer program 105. In FIG. 17, only the components related to the embodiments of the present disclosure are illustrated. Therefore, it will be understood by those of ordinary skill in the art to which the present disclosure pertains that other general-purpose components can be included in addition to the components illustrated in FIG. 17.

The processors 101 control the overall operation of each component of the computing apparatus 100. The processors 101 may include at least one of a central processing unit (CPU), a micro-processor unit (MPU), a micro-controller unit (MCU), a graphic processing unit (GPU), and any form of processor well known in the art to which the present disclosure pertains. In addition, the processors 101 may perform an operation on at least one application or program for executing methods/operations according to various embodiments of the present disclosure. The computing apparatus 100 may include one or more processors.

The memory 103 stores various data, commands and/or information. The memory 103 may load one or more programs 105 from the storage 104 in order to execute methods/operations according to various embodiments of the present disclosure.

For example, when the computer programs 105 are loaded into the memory 103, logic (or modules) may be implemented on the memory 103. The memory 103 may be, but is not limited to, a random access memory (RAM).

The bus 107 provides a communication function between the components of the computing apparatus 100. The bus 107 may be implemented as various forms of buses such as an address bus, a data bus, and a control bus.

The network interface 102 supports wired and wireless Internet communication of the computing apparatus 100. The network interface 102 may support various communication methods other than Internet communication. To this end, the network interface 102 may include a communication module well known in the art to which the present disclosure pertains.

The storage 104 may non-temporarily store one or more programs 105. The storage 104 may include a non-volatile memory such as a flash memory, a hard disk, a removable disk, or any form of computer-readable recording medium well known in the art to which the present disclosure pertains.

The computer program 105 may include one or more instructions in which methods/operations according to various embodiments of the present disclosure are implemented. When the computer program 105 is loaded into the memory 103, the processors 101 may execute the instructions to perform methods/operations according to various embodiments of the present disclosure.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for providing code inspection interface, the method performed by a computing apparatus, the method comprising:
providing a graphical user interface (GUI) for performing code inspection;
executing an analysis routine on an inspection target code when the inspection target code is selected through the GUI; and
providing a result of executing the analysis routine,
wherein the analysis routine comprises a code analysis routine and a security analysis routine,
wherein the code analysis routine analyzes the inspection target code based on a first rule set,
wherein the security analysis routine analyzes the inspection target code based on a second rule set different from the first rule set, and
wherein the executing the analysis routine on the inspection target code comprises:
extracting an abstract syntax tree comprised of a plurality of nodes from the inspection target code;
executing the code analysis routine on the inspection target code using the extracted abstract syntax tree;
inputting the extracted abstract syntax tree into the security analysis routine; and
executing the security analysis routine on the inspection target code using at least a part of the input abstract syntax tree.

2. The method of claim 1, wherein
the code analysis routine implemented in a first programming language; and
the security analysis routine implemented in a second programming language.

3. The method of claim 2, wherein the first programming language is a programming language used to write the inspection target code.

4. The method of claim 1, wherein the providing of the result of executing the analysis routine comprises providing action guide information for the inspection target code based on the result of executing the analysis routine.

5. The method of claim 1, wherein the providing of the GUI comprises displaying a first GUI for receiving an input for selecting the inspection target code, a second GUI for receiving an input for setting a rule set used by the analysis routine, and a third GUI for providing the result of executing the analysis routine.

6. The method of claim 1, wherein the executing of the analysis routine on the inspection target code comprises identifying a code section violating at least a part of a preset rule set from the inspection target code.

7. The method of claim 6, wherein the identifying comprises:
generating a control flow graph showing an execution order of the inspection target code, based on the abstract syntax tree; and
converting the inspection target code into an intermediate representation, based on the abstract syntax tree.

8. The method of claim 7, wherein the identifying comprises identifying the code section violating the at least a part of the preset rule set, based on a result of analyzing a call relationship between functions included in the inspection target code, a variable value used at a specific time, and a point where a change has occurred by an external input value.

9. The method of claim 6, wherein the preset rule set comprises a plurality of rules, each being given a severity attribute; and
the providing of the result of executing the analysis routine comprises providing the result of executing the analysis routine according to the severity attribute of each rule.

10. The method of claim 6, wherein the preset rule set comprises a plurality of rules, each being given a priority attribute; and
the executing of the analysis routine on the inspection target code comprises selecting a rule subset to be applied to the analysis routine from among the preset rule set by using the priority attribute.

11. The method of claim 6, wherein the providing of the GUI for performing the code inspection comprises providing the GUI for adding a new rule to the preset rule set, deleting an unused rule, and updating a rule.

12. The method of claim 6, wherein the preset rule set comprises a rule for detecting a prohibited statement; and the identifying comprises:
  detecting a sentence in which a macro is declared from the inspection target code, based on the rule for detecting the prohibited statement; and
  detecting whether at least one of a list of pre-stored prohibited statements has been used in the sentence in which the macro is declared.

13. The method of claim 12, wherein the detecting of the sentence comprises determining whether a type of the inspection target code is any one of Executable Program, Modulepool Program, Function Group, Class, and Include Program.

14. The method of claim 6, wherein the preset rule set comprises a rule for handling an exception of a remote function communication (RFC) function; and
  the identifying comprises:
  identifying whether an exception related to the RFC function has been registered in the inspection target code, based on the rule for handling the exception of the RFC function;
  identifying whether a RAISE Exception statement exists in a code section corresponding to the RFC function; and
  identifying whether the RAISE Exception statement exists in Include within Function Group if the RAISE Exception statement does not exist in the code section corresponding to the RFC function.

15. The method of claim 6, wherein the preset rule set comprises a rule for checking whether ENQUEUE and DEQUEUE are used in the RFC function; and
  the identifying comprises:
  identifying whether a data manipulation language (DML) statement is used in the code section corresponding to the RFC function in the inspection target code, based on the rule for checking whether ENQUEUE and DEQUEUE are used in the RFC function; and
  identifying whether a character string 'ENQUEUE_E*' exists if the DML statement is used.

16. The method of claim 6, wherein the preset rule set comprises a rule for detecting buffering of a view in which two or more tables are joined; and
  the identifying comprises:
  identifying whether a view exists in a database, based on the rule for detecting the buffering of the view, when a type of the inspection target code is the view; and
  identifying whether buffering is set in the view if joined tables exist in the view.

17. The method of claim 16, wherein the identifying of whether the buffering is set in the view comprises identifying whether a buffer type of the view is P, G, or X by referring to a table containing information of the view.

18. The method of claim 6, wherein the providing of the result of executing the analysis routine comprises calculating a rule violation score of the inspection target code using a result of the identifying the code section violating the at least a part of the preset rule set.

19. A computer-readable non-transitory recording medium storing a computer program that causes a computer to perform the method of claim 1.

20. A code inspection interface providing apparatus comprising:
  one or more processors;
  a communication interface configured to communicate with an external device;
  a memory configured to load a computer program to be executed by the one or more processors; and
  a storage configured to store the computer program comprising instructions that cause the one or more processors to perform operations comprising:
  providing a graphical user interface (GUI) for performing code inspection;
  executing an analysis routine on an inspection target code when the inspection target code is selected through the GUI; and
  providing a result of executing the analysis routine,
  wherein the analysis routine comprises a code analysis routine and a security analysis routine,
  wherein the code analysis routine analyzes the inspection target code based on a first rule set,
  wherein the security analysis routine analyzes the inspection target code based on a second rule set different from the first rule set, and
  wherein the executing the analysis routine on the inspection target code comprises:
  extracting an abstract syntax tree comprised of a plurality of nodes from the inspection target code;
  executing the code analysis routine on the inspection target code using the extracted abstract syntax tree;
  inputting the extracted abstract syntax tree into the security analysis routine; and
  executing the security analysis routine on the inspection target code using at least a part of the input abstract syntax tree.

* * * * *